United States Patent [19]

King

[11] 4,224,044
[45] Sep. 23, 1980

[54] AIR CLEANER WITH VALVE MEANS FOR PREVENTING FUEL VAPOR ESCAPE

[75] Inventor: Jack B. King, Royal Oak, Mich.

[73] Assignee: General Motors Corporation, Detroit, Mich.

[21] Appl. No.: 919,322

[22] Filed: Jun. 26, 1978

[51] Int. Cl.³ ..................... B01D 50/00; B01D 35/14
[52] U.S. Cl. ................................. 55/385 R; 55/498; 55/510; 55/DIG. 28; 123/518; 137/526; 137/859
[58] Field of Search ............ 55/417, 498, 510, 385 R, 55/385 B, DIG. 28; 123/119 R, 136, 142, 198 D, 198 E; 137/526, 852, 859

[56] References Cited

U.S. PATENT DOCUMENTS

| 208,379 | 9/1878 | Downey | 137/526 X |
|---|---|---|---|
| 2,427,525 | 9/1947 | Glanzer | 137/859 X |
| 2,646,063 | 7/1953 | Hayes | 137/859 X |
| 2,927,848 | 3/1960 | Baverstock | 55/DIG. 28 X |
| 3,189,042 | 6/1965 | Kerley, Jr. et al. | 137/526 X |
| 3,811,419 | 5/1974 | Eckert et al. | 55/DIG. 28 X |
| 3,927,656 | 12/1975 | Reed et al. | 123/142 X |
| 4,008,700 | 2/1977 | Pierlot | 123/119 R X |

OTHER PUBLICATIONS

*The Condensed Chemical Dictionary*, 8th ed. N.Y., Reinhold, 1971, p. 766.

*Primary Examiner*—Kathleen J. Prunner
*Attorney, Agent, or Firm*—Ronald L. Phillips

[57] ABSTRACT

An air cleaner for use on internal combustion engines is provided with a bellows valve which is located on the clean side of the filter and blocks the outlet to the carburetor when the engine is not operating to prevent fuel vapor escape and is aspirated by a source of vacuum during engine operation to retract to an open position permitting free filtered air flow to the carburetor.

2 Claims, 4 Drawing Figures

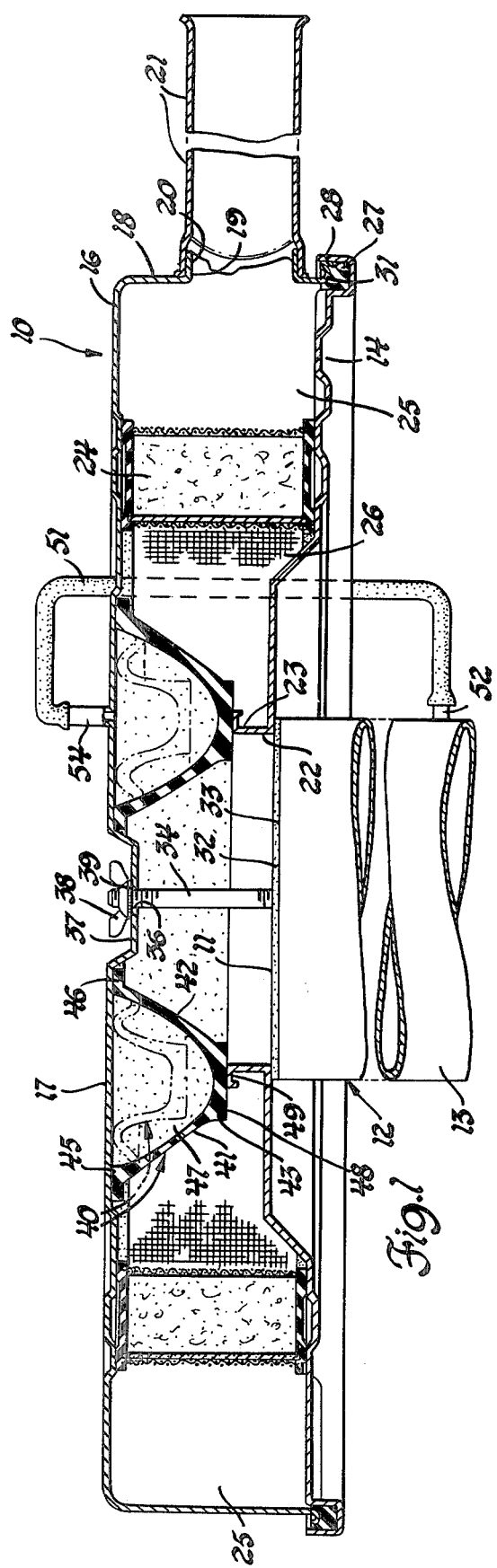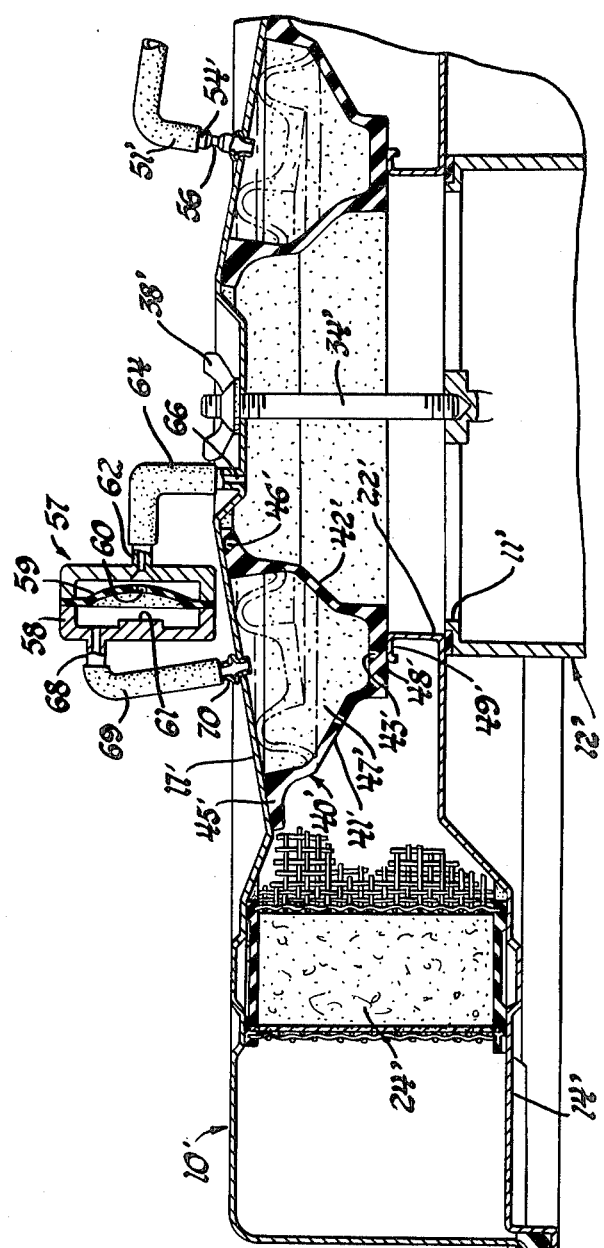

AIR CLEANER WITH VALVE MEANS FOR PREVENTING FUEL VAPOR ESCAPE

The invention relates to an air cleaner for use on internal combustion engines and more particularly to an air cleaner in which vapor escape is prevented at the carburetor inlet.

Heretofore, it has been proposed to prevent fuel vapor escape from the carburetor of an internal combustion engine when the engine is not operating by providing a check valve in the air cleaner's snorkel. Arrangements of this type are disclosed in U.S. Pat. Nos. 3,678,912 and 3,683,878. However, it has been found that such valve arrangements present a substantial restriction to flow which can cause a richer mixture, are exposed to unfiltered air which degrades their sealing surfaces and because of their remote location from the carburetor inlet, they may be rendered substantially ineffective should leakage to atmosphere occur between the snorkel and the carburetor.

The present invention overcomes the above disadvantages with the provision of a bellows valve which is located in the air cleaner casing on the clean side of the filter and operates to seal the outlet to the carburetor. Several embodiments of the invention are disclosed, each having a simple one-piece bellows valve of elastic material secured to the roof of the air cleaner cover and self-biased to close the outlet to the carburetor when the engine is not operating. When the engine is operating, the bellows valve is aspirated by a source of vacuum in the induction system to retract to an open position away from the air cleaner outlet. The bellows valve may be aspirated by connection to manifold vacuum or may be self-aspirated by either an aspirator extending therefrom into the air cleaner outlet or by an opening therein to the air cleaner outlet and response to the pressure depression across the valve seat when the valve opens. Where manifold vacuum is used for aspiration, there may additionally be provided a check valve controlled connection between the bellows valve and the air cleaner outlet downstream of the valve. Then, in the event the connection with manifold vacuum is lost while the engine is still operating and the bellows valve starts to close, the check valve then opens to communicate the pressure depression at the air cleaner outlet to maintain sufficient aspiration to prevent full valve closure. Furthermore, where manifold vacuum is used for aspiration and also where the bellows valve is self-aspirated through an aspirator, the bellows is formed with spaced apart elastic side walls which hold the valve closed and retract on aspiration to lift the valve off and away from the air cleaner outlet while retracting out of the flow path to permit free filtered air flow to the carburetor. In the case of the pressure depression actuated bellows valve, the bellows is formed with a single elastic wall which self-biases the valve to its closed position and retracts on aspiration to present minimum flow restriction to filtered air flow to the carburetor when the valve is opened.

An object of the present invention is to provide a new and improved air cleaner for use on internal combustion engines.

Another object is to provide an air cleaner for use on internal combustion engines having a bellows valve on the clean side of the filter which is biased to close the air cleaner outlet when the engine is not operating and is aspirated by a source of vacuum during engine operation to retract away from the air cleaner outlet to permit free filtered air flow to the carburetor.

Another object is to provide an air cleaner for use on internal combustion engines having a bellows valve which is located on the clean side of the filter and is self-biased to close the air cleaner outlet when the engine is not operating and is aspirated by connection with manifold vacuum to retract to an open position when the engine is operating to permit free filtered air to the carburetor.

Another object is to provide an air cleaner for use on internal combustion engines having a bellows valve of elastic material which is located on the clean side of the filter and is self-biased to close the air cleaner outlet when the engine is not operating and is aspirated by connection with manifold vacuum to retract to an open position when the engine is operating to permit free filtered air flow to the carburetor and is prevented from completely closing on loss of the manifold vacuum connection by aspiration caused by the pressure depression across the partially open valve.

Another object is to provide an air cleaner for use on internal combustion engines having a one-piece bellows valve of elastic material which is located on the clean side of the filter and is self-biased to close the air cleaner outlet when the engine is not operating and is self-aspirated at the air cleaner's outlet to retract to an open position permitting free filtered air flow to the carburetor when the engine is operating.

These and other objects of the invention will be more apparent from the following description and drawing in which:

FIG. 1 is a cross-sectional view of one embodiment of an air cleaner according to the present invention shown mounted on the induction system of an internal combustion engine.

FIG. 2 is an enlarged partial cross-sectional view of another embodiment of the present invention.

Figure 3:
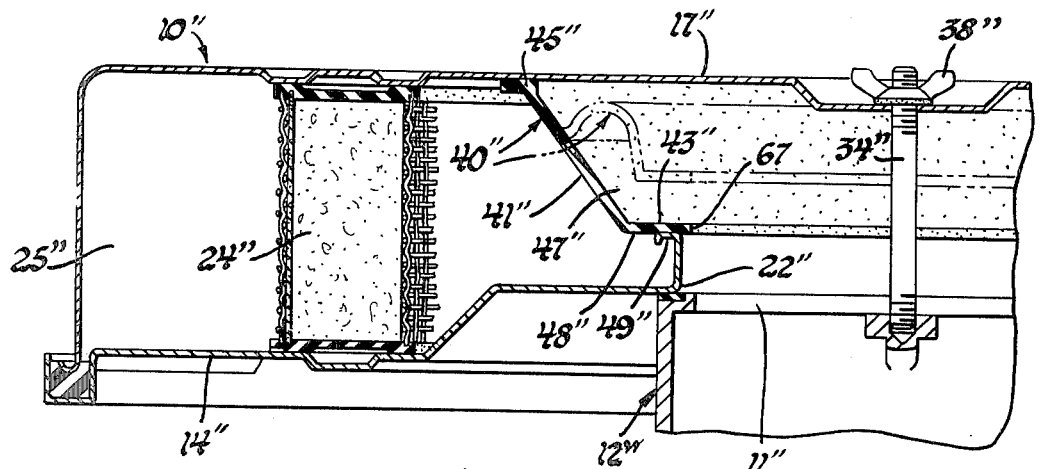
FIG. 3 is an enlarged partial cross-sectional view of another embodiment of the present invention.

Referring to FIG. 1, there is shown one embodiment of an air cleaner generally designated as 10 constructed according to the present invention for use on internal combustion engines, the air cleaner being clampable to the inlet 11 of a carburetor 12 which is mounted on the engine's intake manifold 13. The air cleaner structure comprises a casing formed by a circular base 14 and a circular cover 16 having a roof 17 extending over the base and an annular side 18 extending thereabout. Unfiltered air is admitted into the air cleaner casing by the cover side 18 having an opening 19 therethrough about which is formed an externally projecting flange 20 to which a snorkel 21 is attached. Filtered air is delivered from the air cleaner casing by the base 14 having a centrally located air outlet opening 22 therethrough about which a flange 23 is formed projecting upwardly in the interior of the casing. Air is filtered in the casing by a ring-shaped filter 24 which is sealingly clamped between the roof 17 and the base 14. The filter 24 is positioned radially inward of the side 18 and radially outward of the air outlet 22 leaving an outer annular space 25 about the filter to which the air inlet 19 delivers unfiltered air and an inner space 26 interior of the filter into which the filtered air flows and is then passable to the air outlet 22.

The two casing parts 14 and 16 are sealed by an annular gasket 27 which is mounted in a channel 28 formed about the periphery of the base 14 and is engaged by a bead 31 formed along the lower peripheral edge of the cover side 18. In addition, there is provided an annular gasket 32 which is mounted on a shoulder 33 extending about the carburetor inlet 11 and is engaged by the bottom of the base 14 adjacent the air outlet 22. The air cleaner is removably secured to the carburetor by a stud 34 which is secured to the carburetor and extends up from the interior of the carburetor inlet and through a central opening 36 in a centrally depressed portion 37 of the cover roof 17. A wing nut 38 having a sealing washer 39 underneath engages the stud and on tightening, sealingly clamps the cover against the base while also sealingly clamping the base against the carburetor inlet. Removal of the wing nut 38 permits removal of the cover while the base remains in place to permit replacement of the air filter.

With the air cleaner structure thus far described and assuming there is no blockage at the snorkel 21 or at the air cleaner outlet 22, fuel vapors would be free to escape from the carburetor out through the air cleaner when the engine is not operating. According to the present invention, such fuel vapor escape is positively prevented by a bellows valve generally designated as 40 located in the air cleaner casing on the clean side of the filter 24 and above the air cleaner outlet 22. The bellows valve 40 is so-named because it is both a bellows and a valve and is preferably a one-piece structure of elastic material such as rubber. The bellows valve 40 is annular and has a generally V-shaped cross-section with spaced apart radially inner and outer conical side walls 41 and 42 connected by an annular base wall 43. The bellows valve 40 which thus may also be described as having an annular channel shape is concentric with the air outlet 22 and the elastic side walls 41 and 42 have concentrically located rims 45 and 46 which are bonded to the roof 17 to thereby define a contractible annular chamber 47. The annular base wall 43 of the bellows valve 40 has an external downwardly facing flat annular valve face 48 that is sealingly engageable with an annular valve seat formed by an annular rim 49 extending about the flange 23. The valve seat 49 is spaced a predetermined distance from the roof 17 of the cover and the free form or preinstallation height of the bellows valve 40 is made substantially greater than this distance or space so that when the air cleaner is assembled with the bellows valve secured to the cover, the elastic side walls 41 and 42 provide the bellows valve with a self-bias to hold the valve face 48 against the valve seat 49 to thereby block fuel vapor escape from the carburetor inlet when the engine is not operating.

Retraction of the bellows valve 40 to an open position shown in phantom line unblocking the air cleaner outlet and permitting free filtered air flow from the filtered air space 26 to the carburetor is accomplished by aspirating the chamber 47 to cause its contraction. This is effected by a vacuum hose 51 which is connected at one end by a nipple 52 to the intake manifold 13 and is connected at its opposite end to the bellows chamber 47 by a nipple 54 on the cover roof 17. Thus when the engine is started, the vacuum from the intake manifold immediately aspirates the chamber 47 causing its contraction with the valve face 48 then lifting off and away from the valve seat 49 and the side walls 41 and 42 retracting out of the flow path. Immediate valve opening upon engine starting is assured since the area of chamber 47 is substantially greater than the external area of the inner side wall 42 which is exposed to the carburetor inlet.

In the FIG. 1 embodiment, loss of the retracting vacuum such as by disconnection of the vacuum hose will, of course, permit closure of the valve while the engine is running and thus effect its shutdown. This is positively prevented with a simple modification as shown in the embodiment in FIG. 2. In the FIG. 2 embodiment as well as the FIGS. 3 and 4 embodiments to be later described, parts similar to those in FIG. 1 are identified by like reference numerals only primed and new parts are identified by new numerals.

In the FIG. 2 embodiment, the intake manifold connection to the bellows chamber 47' of the bellows valve 40' is retained but now there is provided an orifice 56 in the manifold vacuum nipple 54' at the roof and also a check valve controlled connection 57 between the bellows chamber 47' and the open space above the air cleaner outlet and carburetor inlet. The check valve controlled connection 57 comprises a check valve having a valve body 58 whose hollow interior is divided by a diaphragm 59 having a central opening 60 therethrough which faces both a valve seat 61 and an opening to a nipple 62. A hose 64 is connected at one end to the nipple 62 and is connected at its other end to a nipple 66 on the cover roof 17' which opens to the space above the air cleaner outlet downstream of the bellows valve. The other side of the diaphragm 59 is open off-center to a nipple 68. A hose 69 is connected at one end to the nipple 68 and at its other end to a nipple 70 on the cover roof 17' which opens to the bellows chamber 47'.

As long as the manifold vacuum hose 51' remains connected and the pressure in the bellows chamber 47' is less than that acting on the exterior thereof, the pressure differential holds the diaphragm 59 against the valve seat 61 in a closed position blocking connection between the bellows chamber 47' and the carburetor inlet. However, in the event the manifold vacuum hose connection is lost, the bellows chamber 47' will start to expand to close the air outlet 22', but prior to closure, the pressure differential across the diaphragm 59 will reverse, causing the diaphragm to leave the valve seat 61 and thus provide connection between the bellows chamber 47' and the carburetor inlet through diaphragm opening 60. This reversal in pressure differential across the diaphragm 59 results from the pressure depression caused by the partially closed air outlet 22' and the vacuum thus then applied to the chamber 47' is sufficient to prevent further valve closure. The result is that the bellows valve thus remains partially opened under the effect of the pressure depression across the valve seat 49'.

In FIG. 3, there is shown a more simplified bowl-shaped bellows valve 40" which, rather than using manifold vacuum for aspiration, is made self-aspirating. This is accomplished by simply eliminating the entire inner conical side wall, leaving only the outer elastic side wall 41" and base wall 43" to define the bellows chamber 47". The chamber 47" is then directly open to the air cleaner outlet 22" and thus the carburetor inlet through a central opening 67 radially inward of the base wall 43". There is no manifold hose connection nor check valve controlled connection for aspiration and instead, on engine starting, the bellows chamber 47" is immediately aspirated by the vacuum caused in the air cleaner outlet 22" which is always open to the carburetor inlet. With retraction of the valve face 48" off the valve seat 49" to the open position shown in phantom line, the flow thereafter through the valve opening maintains a pressure depression to hold the valve in this open position.

Figure 4:
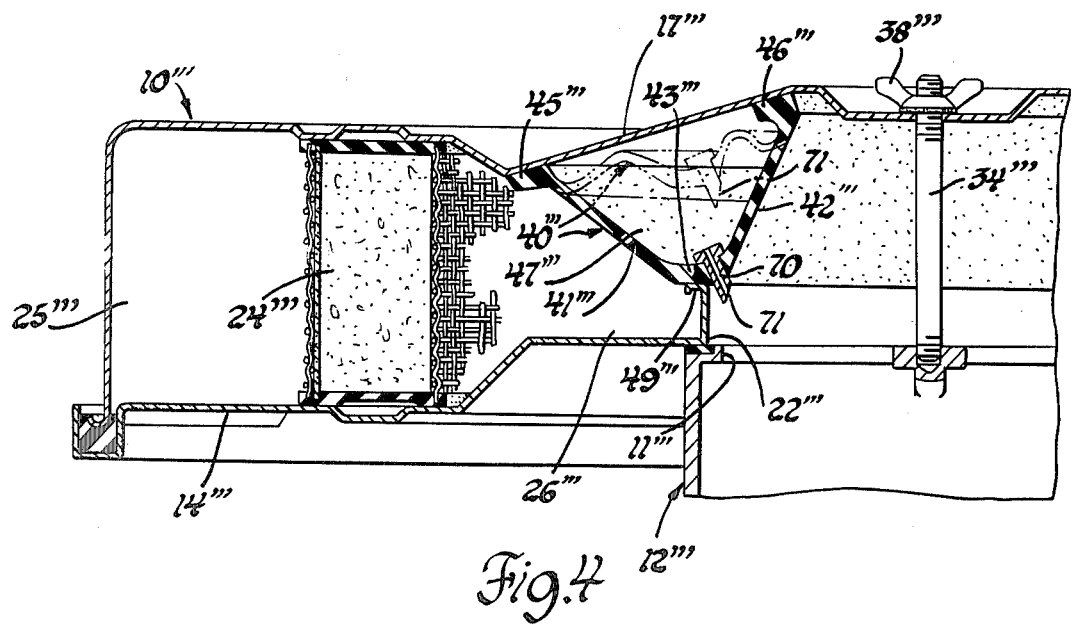
FIG. 4 is an enlarged partial cross-sectional view of another embodiment of the present invention.

The embodiment shown in FIG. 4 is also self-aspirating and presents less flow restriction in the valve open position than that in the FIG. 3 embodiment. In the FIG. 4 embodiment, the inner conical side wall 42''' of the bellows valve 40''' is retained while the manifold vacuum connection and check valve controlled connection are omitted. Instead, there is provided an aspirator tube 70 which is installed through the inner side wall 42''' to communicate not only the pressure depression at the air outlet to the bellows chamber 47''' for valve opening but to add a velocity induced depression to effect and hold a wider valve opening. As before, when the engine is not operating, the bellows valve 40''' is self-biased to close the air cleaner outlet. Then, when the engine is started, the vacuum induced at the air cleaner outlet 22''' aspirates the chamber 47''' to start its contraction and thus opening of the filtered air space 26''' to the carburetor. The aspirator tube 70 has its pickup end 71 pointing downstream in the path of the filtered air flow and as a result, there is then additionally produced a velocity depression transmitted to the bellows chamber 47'''. This flow induced depression increases with air flow and exceeds the valve opening pressure depression and thus causes the bellows valve to move to and hold at a wider open position shown in phantom line wider than that possible with the embodiment in FIG. 3.

The above described embodiments are illustrative of the invention which may be modified within the scope of the appended claims.

The embodiments of the invention in which an exclusive property or privilege is claimed are defined as follows:

1. An air cleaner for an induction system of an internal combustion engine, said air cleaner comprising casing means encasing an air filter and having an air inlet for admitting unfiltered air to the filter and an air outlet for delivering filtered air from the filter to the induction system, and a one-piece annular channel shaped bellows valve secured to a closed side of said casing means opposite said air outlet, said bellows valve having spaced-apart elastic annular side walls depending from said closed side of said casing means, said side walls having an annular valve face formed integral therewith, said side walls being self-biased to seat said annular valve face about said air outlet to close same to said air inlet to prevent fuel vapor escape when the engine is not operating, said elastic annular side walls defining a contractible chamber, said chamber having an aspirator open to and pointing downstream in the flow path at said air outlet whereby on aspiration of said chamber caused by said aspirator when the engine is operating, said elastic annular side walls are contracted and thereby unseat said valve face from about said air outlet to open same to said air inlet to permit normal engine operation.

2. An air cleaner for mounting on a carburetor used to supply an air-fuel mixture into the induction system of an internal combustion engine, said air cleaner comprising casing means including a cover and a base, said cover having a roof over said base and an annular side with an opening therein providing an air inlet to said casing means, an opening in said base beneath said roof providing an air outlet from said casing means to the carburetor, said base having an upstanding annular flange with an annular valve seat encircling said air outlet interior of said casing means, an annular air filter positioned in said casing means radially outward of said annular valve seat and inward of said annular side and extending between said base and said roof, a one-piece annular channel shaped bellows valve of elastic material positioned interior of said casing means and radially inward of said air filter and above said annular valve seat, said bellows valve of elastic material having spaced apart annular side walls connected by an annular base wall, said annular side walls having rims fixed to said roof, said side walls depending downward from said roof to locate said annular base wall adjacent said annular valve seat, said annular base wall having an external annular valve face normally positioned in sealing engagement with said annular valve seat by spring action of said annular side walls whereby to prevent fuel vapor escape from the carburetor when the engine is not in operation, said bellows valve defining a contractible chamber, an aspirator tube in communication at one end with said contractible chamber and at its opposite end with said air outlet so that air pressure in said chamber is reduced during engine operation whereby said contractible chamber contracts and said annular valve face is lifted off and away from said annular valve seat and said annular side walls are retracted to permit free filtered air flow from said air inlet to said air outlet and the carburetor.

* * * * *